United States Patent
Lim et al.

(10) Patent No.: US 9,419,747 B2
(45) Date of Patent: Aug. 16, 2016

(54) METHOD AND APPARATUS TO MANAGE INTERFERENCE BETWEEN IDLE DEVICES

(71) Applicant: Samsung Electronics Co., Ltd., Suwon-si (KR)

(72) Inventors: Jong Bu Lim, Yongin-si (KR); Kyung Hun Jang, Suwon-si (KR); Won Jae Shin, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 171 days.

(21) Appl. No.: 14/106,059

(22) Filed: Dec. 13, 2013

(65) Prior Publication Data

US 2014/0269548 A1  Sep. 18, 2014

(30) Foreign Application Priority Data

Mar. 12, 2013 (KR) .................. 10-2013-0026220

(51) Int. Cl.
    *H04L 1/00* (2006.01)
(52) U.S. Cl.
    CPC ....... *H04L 1/0026* (2013.01); *H04L 2001/0097* (2013.01)
(58) Field of Classification Search
    CPC ......... H04L 47/10; H04L 49/15; H04L 49/25; H04Q 11/04; H04W 36/0083
    See application file for complete search history.

(56) References Cited

U.S. PATENT DOCUMENTS

| 7,664,085 B2 | 2/2010 | Waxman |
| 8,340,580 B1 | 12/2012 | Epstein |
| 8,995,280 B2 * | 3/2015 | Logvinov et al. ............. 370/238 |
| 2005/0058151 A1 | 3/2005 | Yeh |
| 2011/0237272 A1 | 9/2011 | Gorokhov et al. |
| 2012/0044815 A1 | 2/2012 | Geirhofer et al. |
| 2012/0149414 A1 | 6/2012 | Krishnaswamy et al. |
| 2012/0225680 A1 | 9/2012 | Suh |
| 2012/0231739 A1 | 9/2012 | Chen et al. |

FOREIGN PATENT DOCUMENTS

KR    10-1201456 B1    11/2012

OTHER PUBLICATIONS

International Search Report issued on Mar. 20, 2014 for corresponding International Patent Application No. PCT/KR2013/011939.
Chiasserini, Carla F., et al. "Coexistence Mechanisms for Interference Mitigation between IEEE 802.11 WLANs and Bluetooth." INFOCOM 2002. Twenty-First Annual Joint Conference of the IEEE Computer and Communications Societies. 2002. (10 Pages).

* cited by examiner

*Primary Examiner* — Chandrahas Patel
(74) *Attorney, Agent, or Firm* — NSIP Law

(57) ABSTRACT

A method and apparatus to manage interference between idle devices is provided. The method may include determining a pair of a target transmission node and a target reception node among nodes included in a multi-hop network. The method includes determining idle devices cooperating to manage interference in the communication based on a transmission mode determined for communication. The method determines and transmitting coordination information for communication between the pair of the target transmission node and the target reception node, to nodes participating in the communication and the cooperating idle devices.

33 Claims, 20 Drawing Sheets

FIG. 2
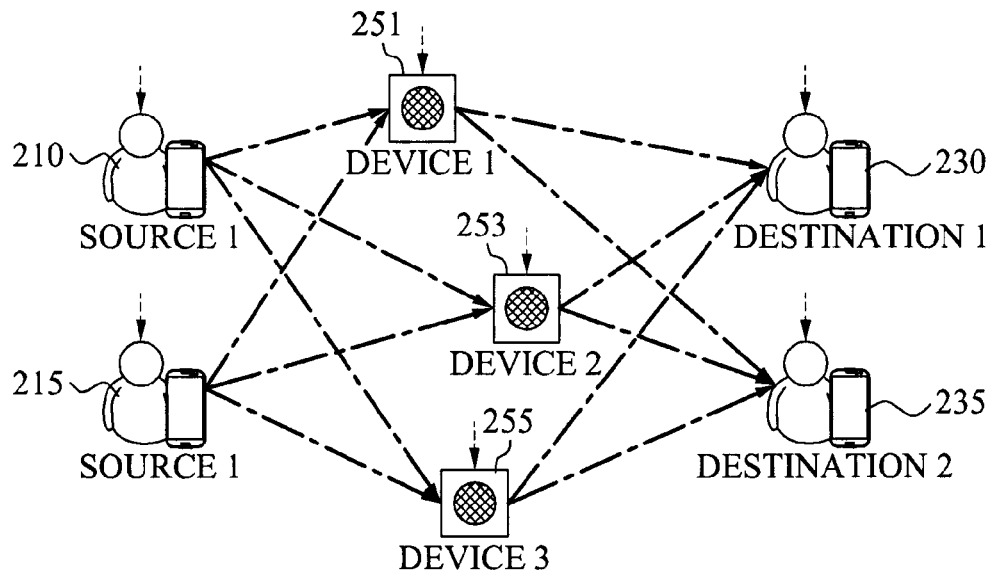
EFFECTIVE CHANNEL
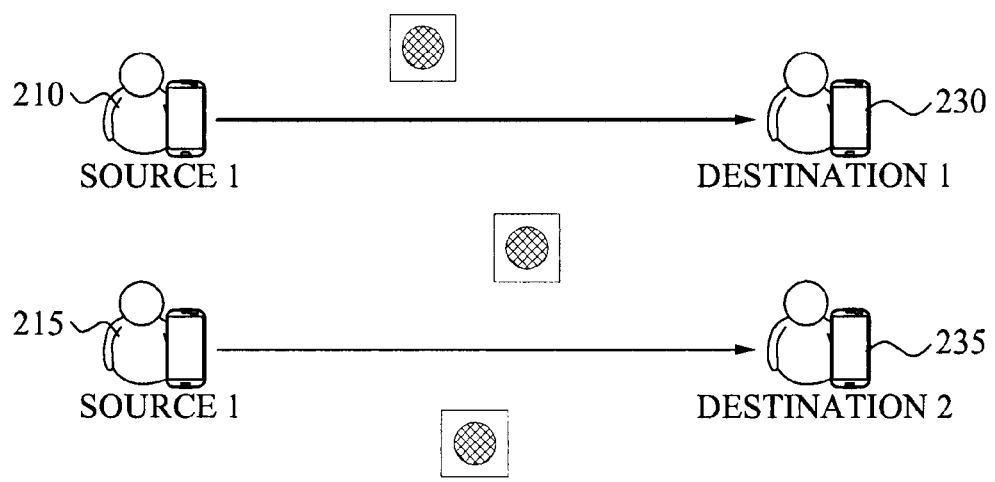

FIG. 5
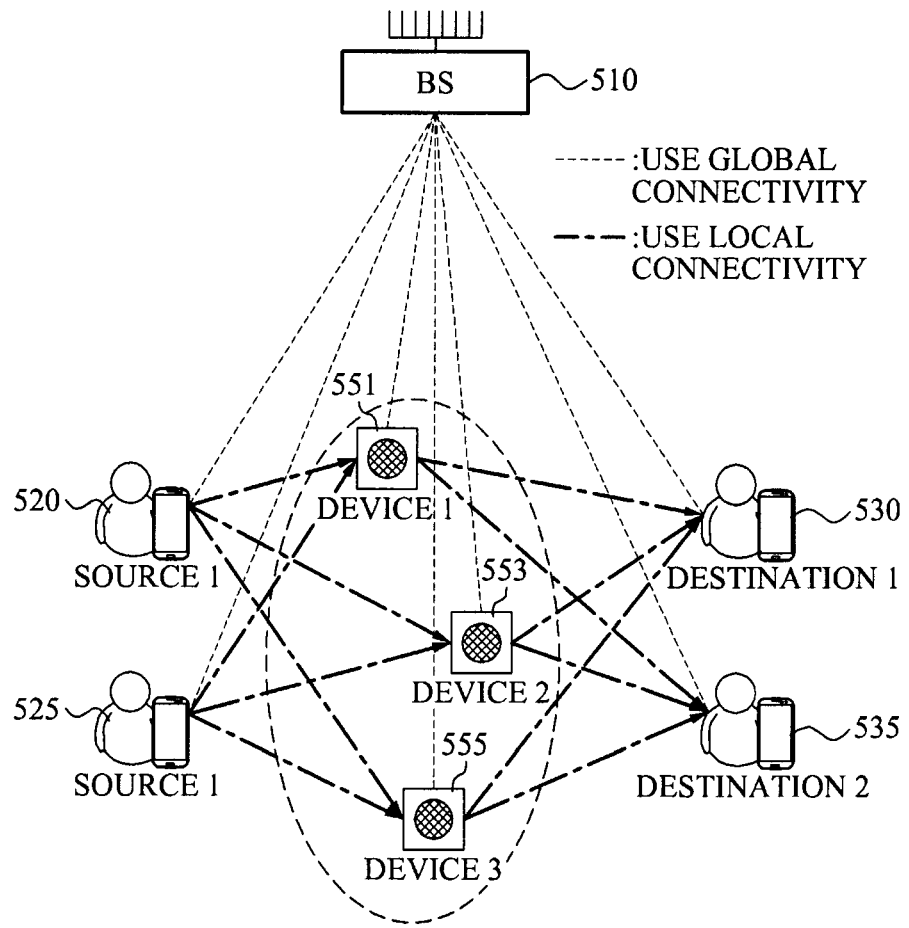
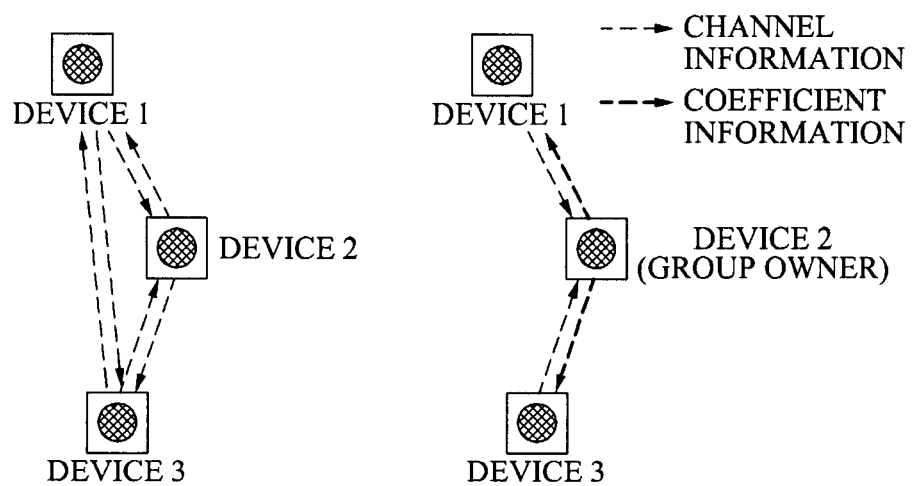

FIG. 10
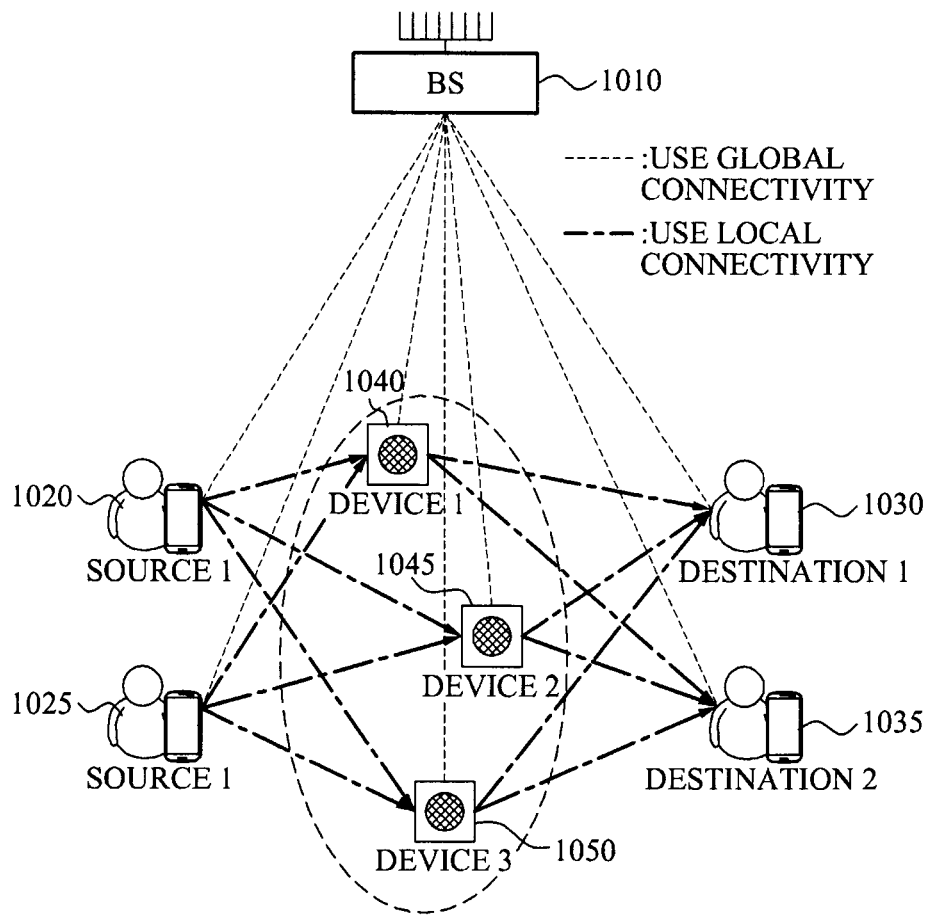
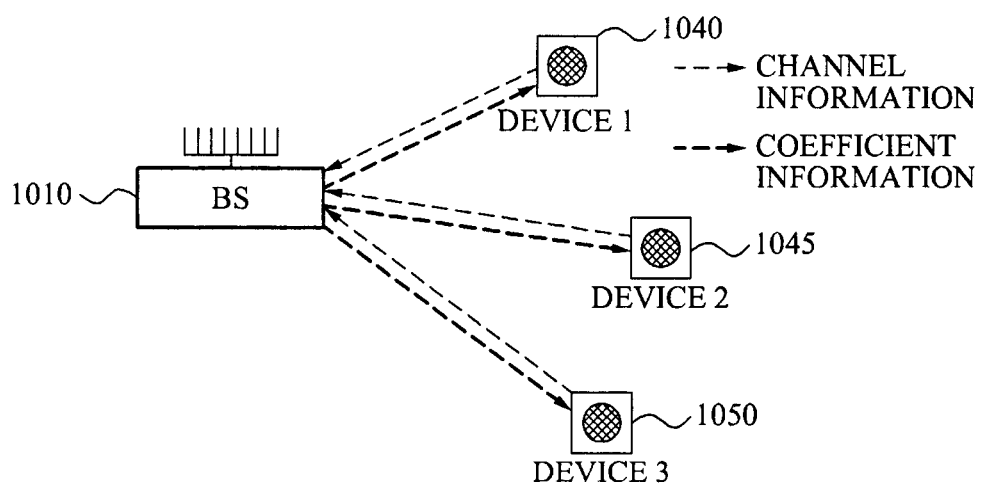

1500

1800

2000

METHOD AND APPARATUS TO MANAGE INTERFERENCE BETWEEN IDLE DEVICES

CROSS-REFERENCE TO RELATED APPLICATION(S)

This application claims the benefit under 35 USC §119(a) of Korean Patent Application No. 10-2013-0026220, filed on Mar. 12, 2013, in the Korean Intellectual Property Office, the entire disclosure of which is incorporated herein by reference for all purposes.

BACKGROUND

1. Field

The following description relates to a method to manage interference between idle devices.

2. Description of Related Art

A rapid increase in use of various wireless devices including a smart phone and a tablet personal computer (PC) and relevant applications has sharply increased wireless data traffic between these various wireless devices. Accordingly, a great number of devices supporting a variety of communication methods, including cellular communication, exchanging wireless data traffic will very likely experience interference. The effects of interference may range from being a minor annoyance to making the wireless system completely unusable.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In accordance with an illustrative configuration, there is provided a method to manage interference, including determining a transmission mode between a first transmission mode of a first communication network and a second transmission mode of a second communication network for communication between a target transmission node and a target reception node; determining idle devices to manage the interference based on the transmission mode; and transmitting coordination information to nodes participating and the idle devices for the communication between the target transmission node and the target reception node.

The determining of the transmission mode may include determining the transmission mode based on a channel capacity of the first communication network and a channel capacity of the second communication network.

The determining of the idle devices may include determining the idle devices cooperating to manage interference in the communication among idle devices connected through the second communication network in response to the transmission mode being the second transmission mode that uses the second communication network.

The method also may include identifying the nodes in the multi-hop network and the idle devices.

The coordination information may include at least one of an indicator informing the target transmission node, the target reception node, and the idle devices of participation in the communication and an indicator informing the target transmission node, the target reception node, and the cooperating idle devices of the communication using the second communication network.

The first communication network may use a different communication method from a communication method of the second communication network.

The first communication network and the second communication network may use wireless resources orthogonal to each other when the first communication network and the second communication network use a same communication method.

The target transmission node and the target reception node in the multi-hop network, and the cooperating idle devices may communicate with one another using the second communication network.

In accordance with an illustrative configuration, there is also provided a method to manage interference, including collecting channel information according to coordination information from idle devices cooperating to manage the interference through a second communication network; determining coefficients of the idle devices cooperating to manage the interference between a target transmission node and a target reception node based on the channel information; and informing the idle devices of the coefficients.

The method may also include transmitting data received from the target transmission node to the target reception node using the coefficients.

In accordance with an illustrative configuration, there is provided a method to manage interference, including determining idle devices cooperating to manage the interference between a target transmission node and a target reception node in a multi-hop network; receiving channel information from the idle devices through a first communication network; determining coefficients to manage interference based on the channel information; and informing the idle devices of the coefficients.

The method may also include determining the target transmission node and the target reception node among nodes in a multi-hop network; and transmitting coordination information to nodes and the idle devices for communication between the target transmission node and the target reception node.

The method may also include determining a transmission mode between a first transmission mode that uses the first communication network and a second transmission mode that uses a second communication network used for communication between the target transmission node and the target reception node. The determining of the idle devices may include determining the idle devices cooperating to manage the interference according to the determined transmission mode.

The determining of the transmission mode may include determining the transmission mode based on a channel capacity of the first communication network and a channel capacity of the second communication network.

The method may also include identifying nodes in the multi-hop network and the idle devices.

The coordination information may include at least one of an indicator informing the target transmission node, the target reception node, and the idle devices of participation in communication and an indicator informing the target transmission node, the target reception node, and the idle devices of execution of the communication using the second communication network.

The target transmission node and the target reception node and the idle devices may communicate with one another using the second communication network.

The first communication network may use a different communication method from a communication method of the second communication network.

The first communication network and the second communication network may use wireless resources orthogonal to each other when the first communication network and the second communication network use a same communication method.

In accordance with an illustrative configuration, there is provided a non-transitory computer readable recording medium storing a program to cause a computer to execute the method described above.

In accordance with an illustrative configuration, there is also provided a method of an idle device to manage interference, including receiving coordination information to communicate between a target transmission node and a target reception node through a first communication network; exchanging, in a second communication network, channel information with other idle devices cooperating to manage interference during communication between the target transmission node and the target reception node based on the coordination information; determining coefficients of the other idle devices based on the channel information; and transmitting the data to the target reception node using the coefficients.

The method may also include multiplying the data by the coefficients and output a product indicative thereof to the target reception node.

In accordance with an alternative configuration, there is provided an apparatus to manage interference, including a transmission mode determination unit configured to determine a transmission mode between a first transmission mode of a first communication network and a second transmission mode of a second communication network for communication between a target transmission node and a target reception node; an idle device determination unit configured to determine idle devices to manage the interference based on the transmission mode; and a transmission unit configured to transmit coordination information to nodes participating and the idle devices for the communication between the target transmission node and the target reception node.

The idle device determination unit may be further configured to determine the idle devices cooperating to manage interference in the communication among idle devices connected through the second communication network in response to the transmission mode being the second transmission mode that uses the second communication network.

The first communication network and the second communication network may use wireless resources orthogonal to each other when the first communication network and the second communication network use a same communication apparatus.

The target transmission node and the target reception node in the multi-hop network, and the cooperating idle devices may communicate with one another using the second communication network.

In accordance with a configuration, there is provided an apparatus to manage interference, including a collecting unit configured to collect channel information according to coordination information from idle devices cooperating to manage the interference through a second communication network; a coefficient determination unit configured to determine coefficients of the idle devices cooperating to manage the interference between a target transmission node and a target reception node based on the channel information; and a transmission unit configured to inform the idle devices of the coefficients.

In accordance with an another configuration, there is provided an apparatus to manage interference, including an idle devices determination unit configured to determine idle devices cooperating to manage the interference between a target transmission node and a target reception node in a multi-hop network; a receiving unit configured to receive channel information from the idle devices through a first communication network; a coefficient determination unit configured to determine coefficients to manage interference based on the channel information; and a transmission unit configured to inform the idle devices of the coefficients.

The apparatus may also include a transmission determination unit configured to determine the target transmission node and the target reception node among nodes in a multi-hop network, wherein the transmission unit is further configured to transmit coordination information to nodes and the idle devices for communication between the target transmission node and the target reception node.

The apparatus may also include a transmission determination unit configured to determine a transmission mode between a first transmission mode that uses the first communication network and a second transmission mode that uses a second communication network used for communication between the target transmission node and the target reception node, wherein the idle devices determination unit is further configured to determine the idle devices cooperating to manage the interference according to the determined transmission mode.

The transmission determination unit may be further configured to determine the transmission mode based on a channel capacity of the first communication network and a channel capacity of the second communication network.

The first communication network and the second communication network may use wireless resources orthogonal to each other when the first communication network and the second communication network use a same communication apparatus.

In accordance with an alternative configuration, there is provided an apparatus of an idle device to manage interference, including a receiving unit configured to receive coordination information to communicate between a target transmission node and a target reception node through a first communication network, and configured to exchange, in a second communication network, channel information with other idle devices cooperating to manage interference during communication between the target transmission node and the target reception node based on the coordination information; a coefficient determination unit configured to determine coefficients of the other idle devices based on the channel information; and a transmission unit configured to transmit the data to the target reception node using the coefficients.

Other features and aspects will be apparent from the following detailed description, the drawings, and the claims.

BRIEF DESCRIPTION OF THE DRAWINGS

FIG. 2 is a diagram illustrating a method to manage interference between idle devices in the multi-hop network, in accordance with an embodiment.

FIG. 5 is a diagram illustrating a multi-hop network and a method to manage interference between idle devices in the multi-hop network, in accordance with an embodiment.

FIG. 10 is a diagram illustrating a method to manage interference between idle devices in another example of a multi-hop network, in accordance with an embodiment.

Figure 1:
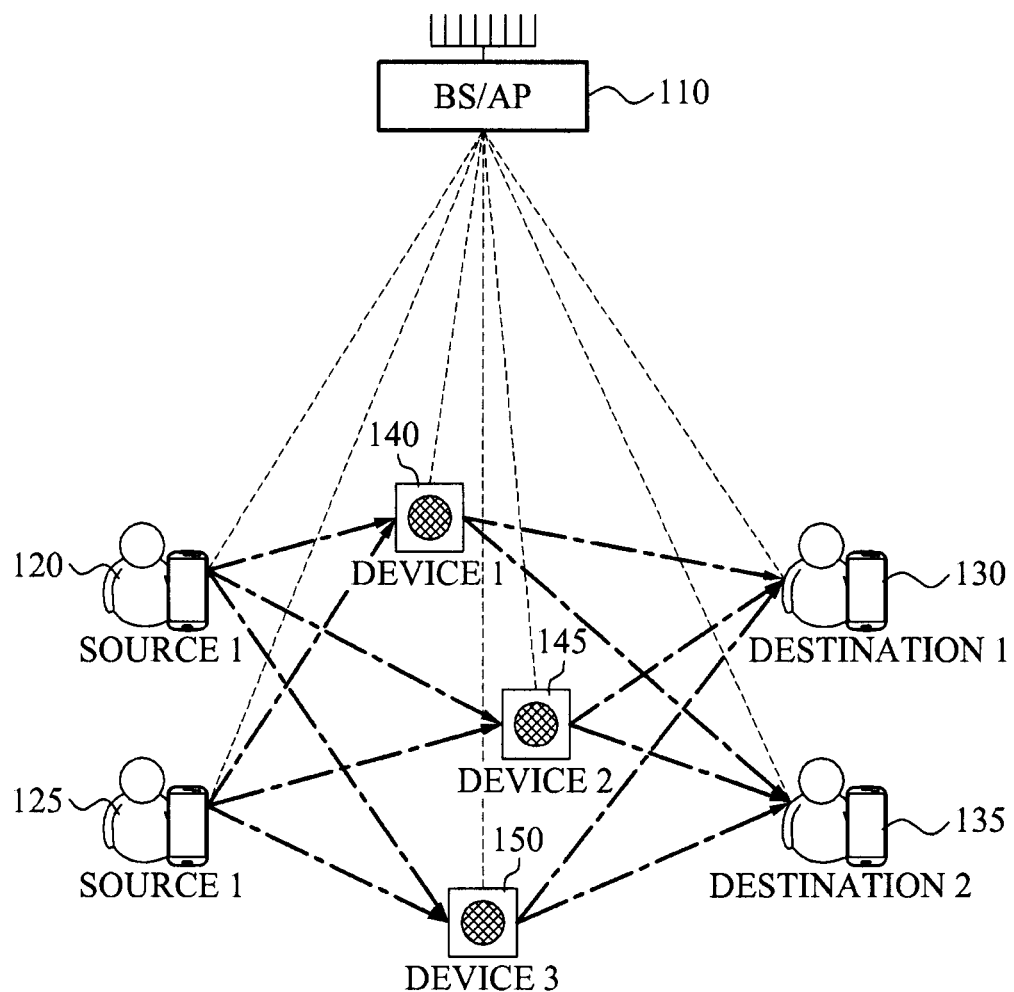
FIG. 1 is a diagram illustrating a multi-hop network in which interference is managed between idle devices, in accordance with an embodiment.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses, and/or methods described herein will be suggested to those of ordinary skill in the art. The progression of processing steps and/or operations described is an example; however, the sequence of steps and/or operations is not limited to that set forth herein and may be changed as is known in the art, with the exception of steps and/or operations necessarily occurring in a certain order. Also, description of well-known functions and constructions may be omitted for increased clarity and conciseness.

In the following description, 'idle device(s)' may refer to device(s) maintained in an idle state, that is, an unused state, by a user. A 'first communication network' may refer to a communication network for global connectivity and a 'second communication network' may refer to a communication network for local connectivity.

FIG. 1 is a diagram illustrating a multi-hop network in which interference is managed between idle devices, in accordance with an embodiment.

Referring to FIG. 1, a multi-hop network includes a base station or access point (AP) 110, a first transmission node 120, a second transmission node 125, a first reception node 130, a second reception node 135, and idle devices 140, 145, and 150. The base station or AP 110 may also be referred to as a 'coordinator' because this device may accomplish interference-free communication between the idle devices 140, 145, and 150.

The coordinator 110 uses global connectivity as a control channel for communication coordination with the transmission nodes 120 and 125, the reception nodes 130 and 135, and the idle devices 140, 145, and 150. The coordinator 110 provides synchronization signals to the transmission nodes 120 and 125, the reception nodes 130 and 135, and the idle devices 140, 145, and 150 through the control channel, or may deliver transmission mode selection, power control, scheduling and modulation, coding rate determination, and other types of control or operation signals or modes.

The transmission nodes 120 and 125, the reception nodes 130 and 135, and the idle devices 140, 145, and 150 use local connectivity as a data channel for data transmission.

For the global connectivity as the control channel, the coordinator 110 operates in a first communication network including a cellular network, a wireless local area network (WLAN), and a wireless personal area network (WPAN). For the local connectivity as the data channel, the transmission nodes 120 and 125, the reception nodes 130 and 135, and the idle devices 140, 145, and 150 operate in a second communication network including a cellular network, WLAN, WPAN, wireless fidelity (WiFi), Bluetooth, Zigbee, near field communication (NFC), and wireless gigabit alliance (Wi-Gig).

For example, when a cellular network is used as the first communication network and WiFi, Bluetooth, and ZigBee are used as the second communication network, the idle devices 140, 145, and 150 may include any type of peripheral devices capable of supporting cellular communication methods. The idle devices 140, 145, and 150 may be a nano relay, a terminal, a machine to machine (M2M) device, a device to device (D2D) device, a laptop personal computer (PC), a desktop PC, a tablet PC, and similar devices and may support various communication methods.

When WiFi wireless resources are used as the first communication network and Bluetooth, and ZigBee are used as the second communication network, the idle devices 140, 145, and 150 may be any type of peripheral device enabled to support WiFi communication methods such as home appliances, including a smart TV or a refrigerator, a nano relay, a terminal, an M2M device, a D2D device, a laptop PC, a desktop PC, a tablet PC, and similar devices and may support various communication methods.

In one example, the first communication network and the second communication network use different communication methods. When the first communication network and the second communication network use the same communication method, the first communication network and the second communication network may communicate using wireless resources orthogonal to each other. For example, when the first communication network and the second communication network are cellular networks, the first communication network is configured to use wireless resources of the cellular network orthogonal to the second communication network.

According to an embodiment, the idle devices 140, 145, and 150 around nodes function as a cooperation node or relay node configured to manage interference generated during communication between multiple users. That is, interference created or generated between the first and second transmission nodes 120 and 125 and the first and second reception nodes 130 and 135 is managed at the idle devices 140, 145, and 150 or the coordinator 110. In one example, the coordinator 110 or the idle devices 140, 145, and 150 manage the interference by controlling coefficients of the idle devices 140, 145, and 150 with respect to effective channels between the transmission nodes 120 and 125 and the reception nodes 130 and 135. The management of interference includes controlling the coefficients of the idle devices 140, 145, and 150 to neutralize interference. A method performed by the coordinator 110 or the idle devices 140, 145, and 150 to manage interference will be described with reference to FIG. 2.

According an embodiment, the method of FIG. 2 enables a plurality of transmission nodes to simultaneously perform data transmission through local connectivity without interfering with one another, simultaneous transmission between the multiple users may be enabled. Also, a network capacity with respect to the global connectivity may be increased.

FIG. 2 is a diagram illustrating a method to manage interference between idle devices in the multi-hop network, in accordance with an embodiment.

Referring to FIG. 2, in the multi-hop network, a plurality of transmission nodes 210 and 215 transmit data to a plurality of reception nodes 230 and 235 through a plurality of idle devices 251, 253, and 255, respectively. In one example, a channel between the plurality of transmission nodes 210 and 215 and the plurality of idle devices 251, 253, and 255 may be referred to as $H_1$ and a channel between the plurality of idle devices 251, 253, and 255 and the plurality of reception nodes 230 and 235 may be referred to as $H_2$.

However, when pairs of the plurality of transmission nodes 210 and 215 and reception nodes 230 and 235 transmit signals simultaneously, the signals or streams through channels $H_1$ and $H_2$ may be mixed during multi-hopping, thereby causing an inter-stream interference. Therefore, according to an embodiment, the idle devices 251, 253, and 255 manage interference generated during communication, by performing neutralization of interference between the transmission nodes 210 and 215 and the reception nodes 230 and 235.

Interference neutralization (IN) is a method to control interference between processing signals through multi-hopping. The IN manages interference detected at the reception nodes 230 and 235 by controlling gains or amplifying coefficients of transmitting signals multiplied by the idle devices 251, 253, and 255.

In the multi-hop network, the amplifying coefficients multiplied by the idle devices 251, 253, and 255 may be expressed as a G matrix. Hereinafter, an amplifying coefficient may be referred as an 'amplifying coefficient.'

In one configuration in which all nodes, transmission nodes 210 and 215 and reception nodes 230 and 235, in the multi-hop network include single antennas, the G matrix may be a diagonal matrix. For the IN, inter-stream interference needs to be thoroughly managed. Therefore, the G matrix would be configured such that gains of the effective channels, for example the channels $H_1$ and $H_2$, are formed into the diagonal matrix.

Conditions for the IN may be expressed by Equation 1.

$$K_1 \geq ((N-1)N)+1 \qquad \text{[Equation 1]}$$

Here, $K_1$ denotes a minimum number of relay nodes, such as idle devices 251, 253, and 255, to perfect IN when an N-number of pairs of the transmission nodes and reception nodes transmit the signals. In one example, N is a natural number greater than 1.

For example, in the multi-hop network in which the number of pairs of the transmission nodes 210 and 215 and the reception nodes 230 and 235 is 2, the minimum number $K_1$ of the idle devices necessary for the IN according to Equation 1 is $K_1=N(N-1)+1=3$.

When the idle devices 251, 253, and 255 perform the IN through an amplify and forward method, an interfering multi-hop network having interference according to topology as shown in an upper diagram of FIG. 2 may be expressed as an equivalent single-hop network as shown in a lower diagram of FIG. 2. Furthermore, the interfering multi-hop network may be considered as a multiple peer-to-peer (P2P) network because all interferences on the channel are managed in the network shown in the lower diagram of FIG. 2.

Thus, according to the IN, although the signals transmitted from the transmission nodes 210 and 215 through respective channels interfere with respect to each other while passing through the idle devices 251, 253, and 255, the interfered signals are offset to resolve the interference. Accordingly, interference-free signals may be finally received at the reception nodes 230 and 235.

In accordance with one aspect, data from the reception nodes 230 and 235 is transmitted to the transmission nodes 210 and 215 using an algorithm, such as multiple-input-multiple-output (MIMO), under a control of a coordinator, such as a base station or an AP, after a pair of a transmission node and a reception node is determined In addition, the reception nodes 230 and 235 are aware of effective channels between the transmission nodes 210 and 215 and the reception nodes 230 and 235.

Figure 3:
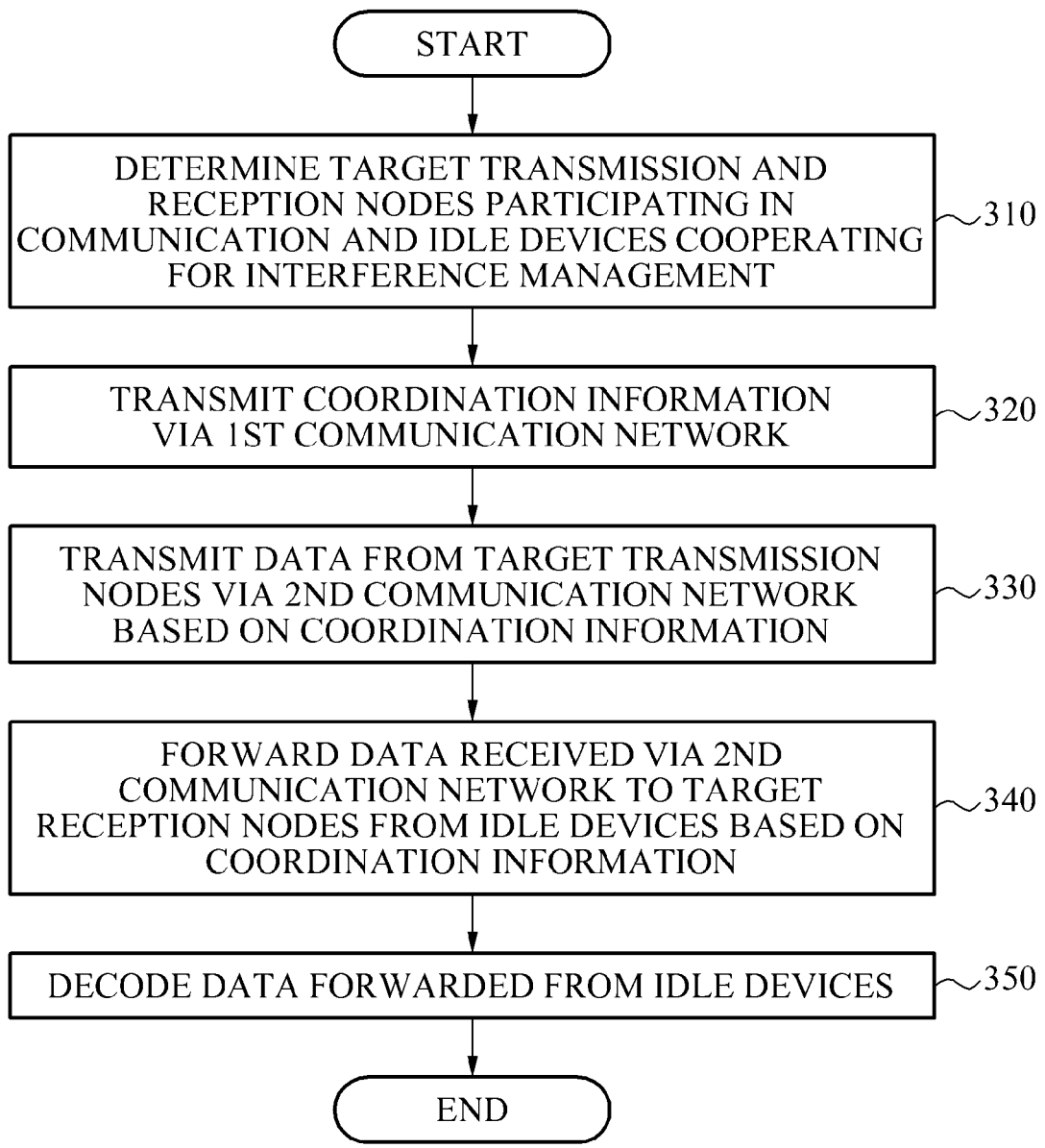
FIG. 3 is a flow diagram illustrating a method performed in a coordinator, target transmission and reception nodes, and idle devices to manage interference based on cooperation in the multi-hop network, in accordance with an embodiment.

FIG. 3 is a flow diagram illustrating a method performed in a coordinator, target transmission and reception nodes, and idle devices to manage interference based on cooperation in the multi-hop network, in accordance with an embodiment.

At operation 310, at the coordinator, the method searches for nodes in the multi-hop network and searches for idle devices of the nodes. The method determines target transmission nodes, target reception nodes, and idle devices, which are to participate in communication and cooperate to manage interference, among the nodes and the idle devices found.

At operation 320, through a first communication network, the method transmits coordination information from the coordinator to the target transmission nodes, the target reception nodes, and the idle devices cooperating to manage interference. The coordination information may include an indicator informing the target transmission nodes, the target reception nodes, and the cooperating idle devices of participation in the communication and an indicator informing the target transmission nodes, the target reception nodes, and the cooperating idle devices of execution of the communication using a second communication network.

At operation 330, through the second communication network, the method transmits data from the target transmission nodes to the cooperating idle devices based on the coordination information received from the coordinator.

At operation 340, through the second communication network, the method forwards the data received from the target transmission node from the cooperating idle devices to the target reception nodes based on the coordination information received from the coordinator.

At operation 350, the method decodes, at the target reception nodes, the data using the information forwarded from the idle devices and the coordination information.

Hereinafter, operations of the coordinator, the idle devices, and the target transmission nodes and target reception nodes included in the multi-hop network will be described with reference to FIGS. 4 through 9.

Figure 4:
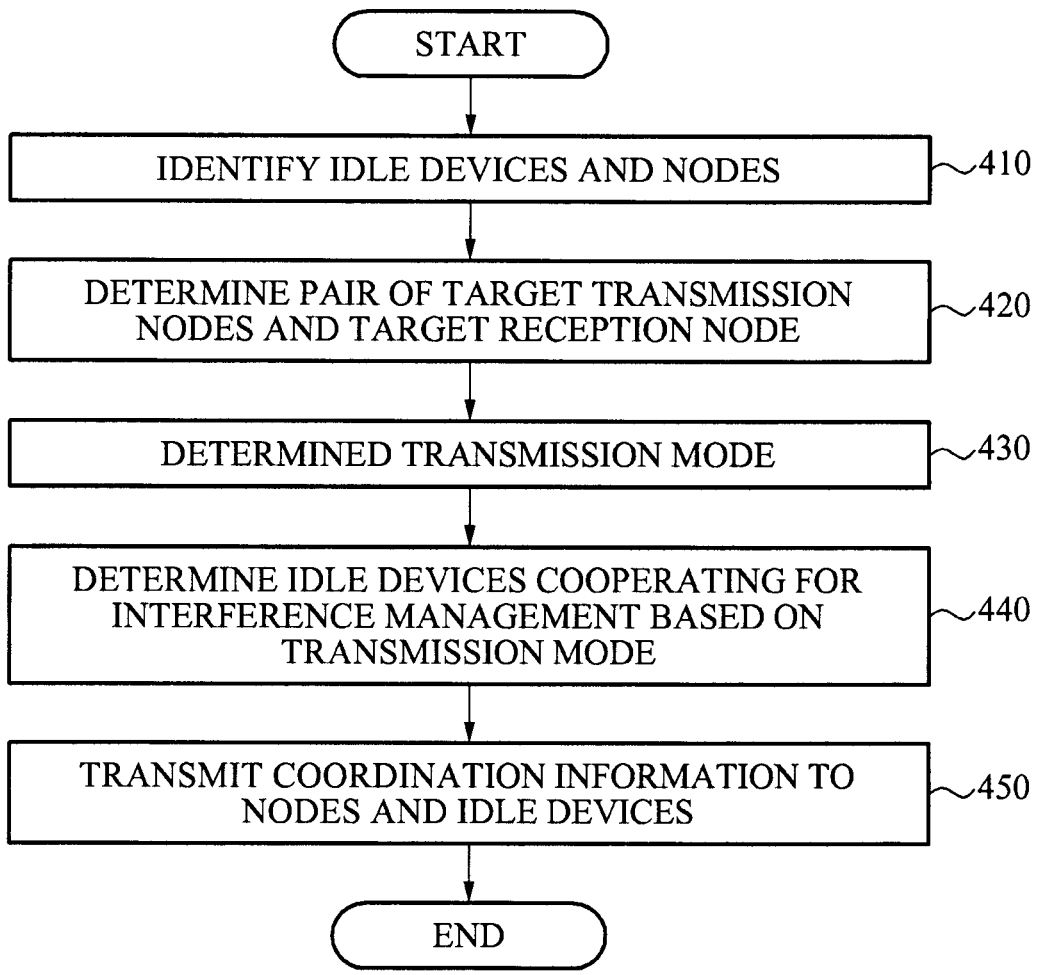
FIG. 4 is a flow chart illustrating a method to manage interference between idle devices at the coordinator, in accordance with an embodiment.

FIG. 4 is a flow chart illustrating a method to manage interference at a coordinator between idle devices, in accordance with an embodiment.

Referring to FIG. 4, at operation 410, at the coordinator, the method identifies nodes included in the multi-hop network and idle devices. At operation 420, the method determines a pair of a target transmission node and a target reception node among the nodes identified.

At operation 430, the method chooses at least one transmission mode between a first transmission mode that uses a first communication network and a second transmission mode that uses a second communication network to communicate between the pair of the target transmission node and the target reception node. In one example, the transmission mode denotes whether global connectivity, such as a cellular network, or local connectivity, such as WiFi, Bluetooth, or Zigbee, is to be used for data transmission.

At operation 430, the method chooses the transmission mode based on a channel capacity of the first communication network and a channel capacity of the second communication network.

Additionally, at operation 430, the method at the coordinator chooses the transmission mode to support communication using the cellular network when the channel capacity of the global connectivity, for example the cellular network, is sufficient and using local connectivity, such as WiFi, Bluetooth, and Zigbee, when the channel capacity of the cellular network is insufficient.

At operation 440, the method determines the idle devices that cooperate in interference management during communication, based on the chosen transmission mode. When the chosen transmission mode is the second transmission mode that uses the second communication network, the method determines the idle devices cooperating during interference management among the idle devices connected through the second communication network.

At operation 450, the method transmits coordination information to the nodes participating in the communication determined at operation 420 and the cooperating idle devices determined at operation 440. The coordination information, in one example, is used to enable effective communication between the pair of the target transmission node and the target reception node. The coordination information may include at least one of an indicator informing the target transmission node, the target reception node, and the cooperating idle devices of a participation in the communication between the pair of the target transmission node and the target reception node; and an indicator informing the target transmission node, the target reception node, and the cooperating idle devices of using the second communication network to communicate.

In one example, the target transmission node and the target reception node included in the multi-hop network and the idle devices are connected with the coordinator through the first communication network. The target transmission node, the target reception node, and the idle devices may communicate with one another through the second communication network.

FIG. 5 is a diagram illustrating a multi-hop network and a method to manage interference between idle devices in the multi-hop network, in accordance with an embodiment.

Referring to FIG. 5, the multi-hop network according to the embodiment includes a base station 510, a first transmission node 520, a second transmission node 525, a first reception node 530, a second reception node 535, and idle devices 551, 553, and 555. In the following description, the base station 510 may be replaced with an AP.

The base station 510 may use global connectivity, for example a cellular network, as a control channel to coordinate communication between the transmission nodes 520 and 525, the reception nodes 530 and 535, and idle devices 551, 553, and 555. In addition, the transmission nodes 520 and 525, the reception nodes 530 and 535, and the idle devices 551, 553, and 555 use local connectivity, such as WiFi, Bluetooth, and Zigbee, as a data channel for data transmission.

In FIG. 5, the idle devices 551, 553, and 555 exchange channel information using local connectivity and determine coefficients of the idle devices 551, 553, and 555, respectively, based on the channel information so that interference between the pair of the transmission node and the reception node is managed.

Therefore, users, for example, the transmission nodes 520 and 525 and reception nodes 530 and 535 transmit and receive data in a local network without interference as in a P2P environment including a single pair of a transmission node and a reception node. In one example, as shown in a lower left diagram of FIG. 5, the coefficients of the idle devices 551, 553, and 555 to manage interference are determined in the idle devices 551, 553, and 555, respectively, through exchange of the channel information among the idle devices 551, 553, and 555. Alternatively, as shown in a lower right diagram of FIG. 5, the coefficients may be determined by a particular idle device, for example a device 2 553, functioning as a group owner and collecting the channel information from the other idle devices, device 1 and device 3.

An embodiment in which the coefficients are determined through the channel information exchange between the idle devices will be described with reference to FIG. 6. An embodiment in which the coefficients are determined by a particular idle device collecting the channel information of the other idle devices will be described with reference to FIG. 7.

Figure 6:
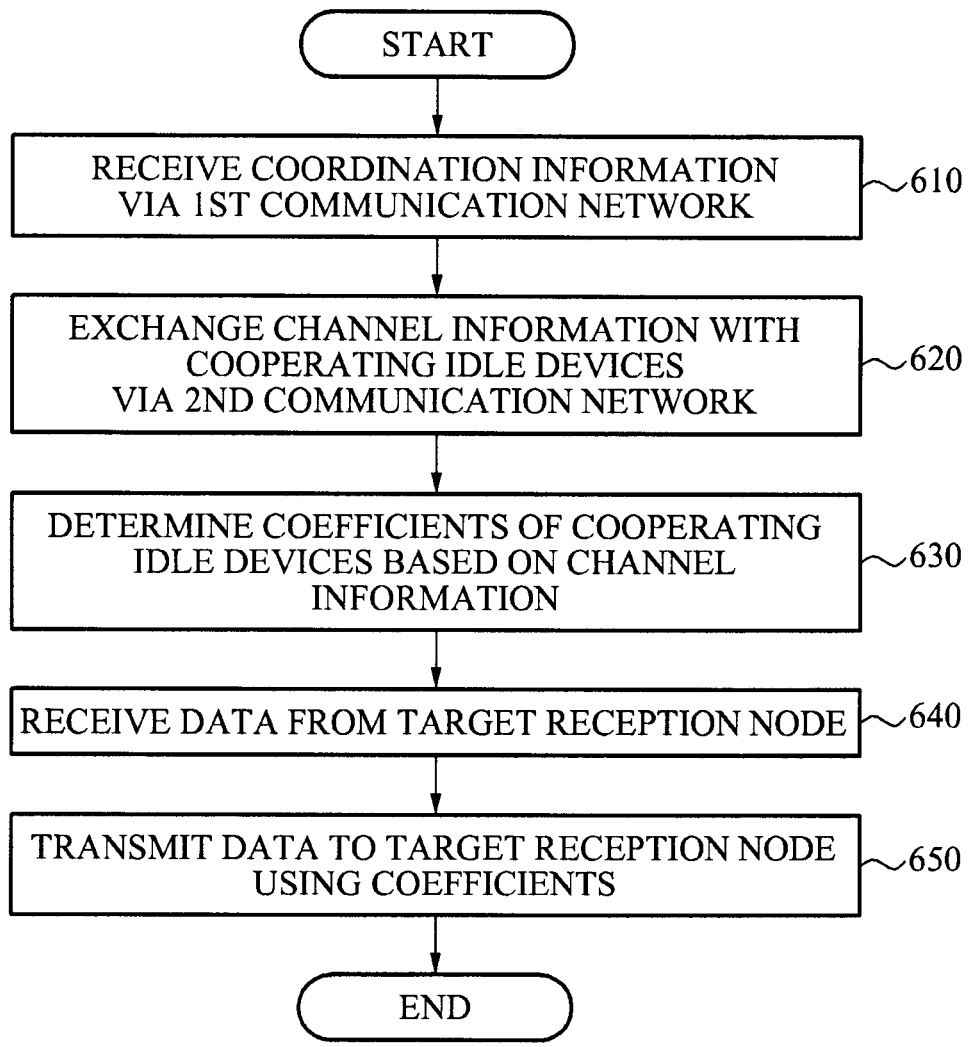
FIG. 6 is a flow chart illustrating a method of an idle device to manage interference between idle devices, in accordance with an embodiment.

FIG. 6 is a flow chart illustrating a method of an idle device to manage interference between idle devices, in accordance with an embodiment.

Referring to FIG. 6, at operation 610, the method receives at the idle device coordination information from a coordinator to communicate between a pair of a target transmission node and a target reception node through a first communication network.

At operation 620, in a second communication network, the method of the idle device exchanges channel information with other idle devices cooperating to manage interference during communication between the transmission node and the target reception node according to the coordination information received at operation 610. The method at the idle device transmits data received from the target transmission node to the target reception node based on the channel information.

At operation 630, the method of the idle device determines coefficients of the cooperating idle devices based on the channel information exchanged at operation 620.

At operation 640, the method of the idle device receives the data from the target transmission node, and, at operation 650, the method transmits the data to the target reception node using the coefficients determined at operation 630. At operation 650, the method of the idle device multiplies the data received at operation 640 by the coefficients determined at operation 630, and transmits the product to the target reception node, which is a final reception node.

Figure 7:
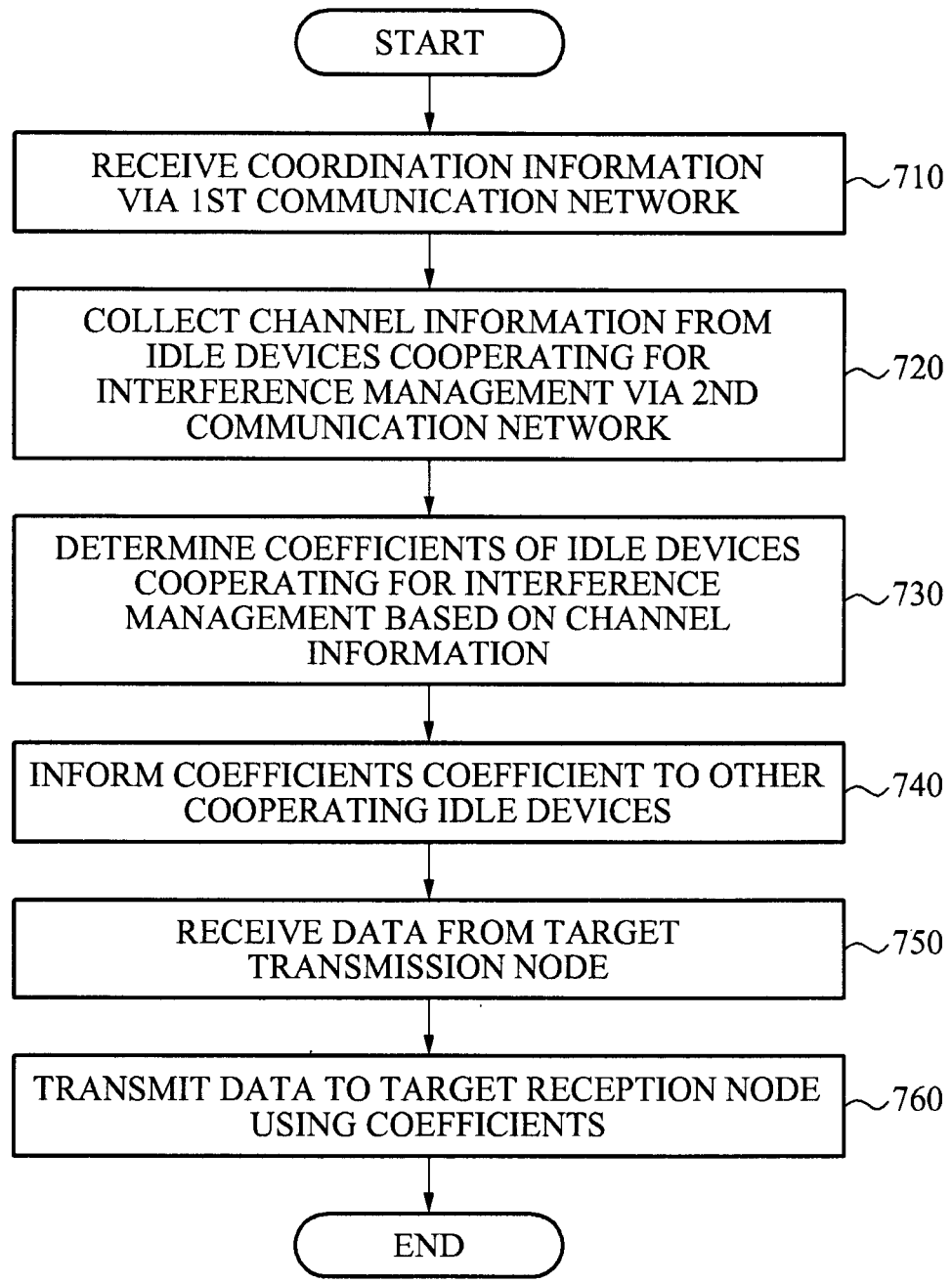
FIG. 7 is a flow chart illustrating another method of an idle device to manage interference between idle devices, in accordance with an embodiment.

FIG. 7 is a flow chart illustrating another method of an idle device to manage interference between idle devices, in accordance with an embodiment.

Referring to FIG. 7, at operation 710, the method receives coordination information from a coordinator through a first communication network.

At operation 720, the method collects channel information from other idle devices cooperating to manage interference and communicating with a pair of a target transmission node and a target reception node, through a second communication network, according to the coordination information.

At operation 730, the method determines coefficients of the cooperating idle devices based on the channel information collected.

At operation 740, the method informs other cooperating idle devices of the coefficients determined.

At operation 750, the method receives data from the target transmission node, and, at operation 760, transmits the data to the target reception node using the coefficients determined. At operation 760, the method of the idle device multiplies the data received by the coefficients determined, and transmits the product to the target reception node, which is a final reception node.

Figure 8:
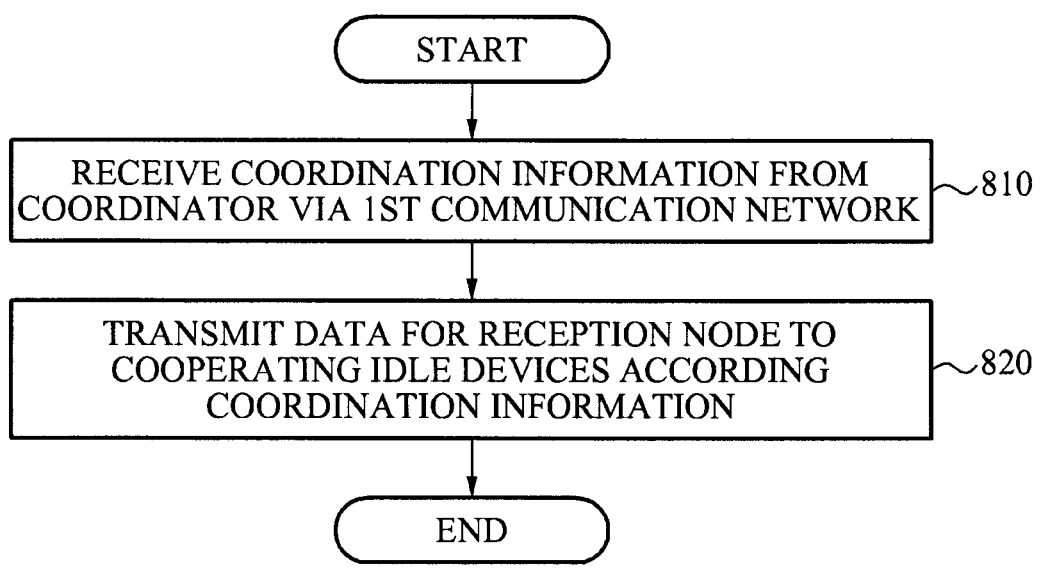
FIG. 8 is a flow chart illustrating a method to manage interference between idle devices at a target transmission node, in accordance with an embodiment.

FIG. 8 is a flow chart illustrating a method to manage interference between idle devices at a target transmission node, in accordance with an embodiment.

Referring to FIG. 8, at operation 810, through a first communication network, the method at the target transmission node receives from a coordinator coordination information for communication between a pair of the target transmission node and a target reception node.

At operation 820, through a second communication network, the method at the target transmission node transmits data to the idle devices to be then transmitted to the target reception node so that the idle devices cooperate to manage interference according to the coordination information received.

Figure 9:
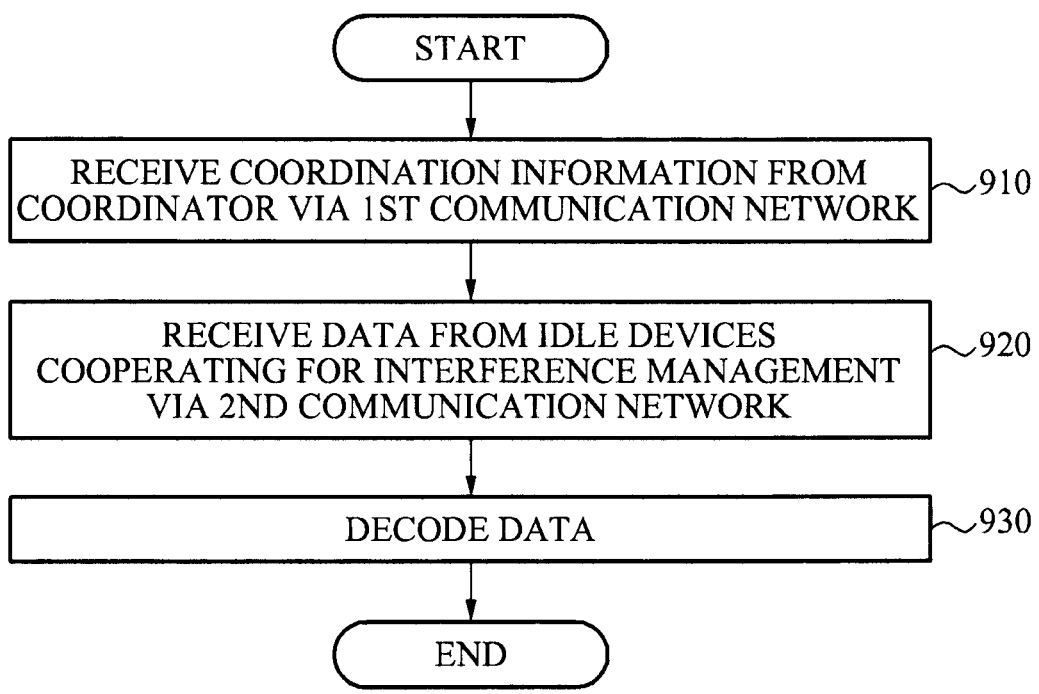
FIG. 9 is a flow chart illustrating a method to manage interference between idle devices at a target reception node, in accordance with an embodiment.

FIG. 9 is a flow chart illustrating a method to manage interference between idle devices at a target reception node, in accordance with an embodiment.

Referring to FIG. 9, at operation 910, through a first communication network, the method of the target reception node receives coordination information from a coordinator to communicate with a pair of a target transmission node and the target reception node.

At operation 920, according to the coordination information, through a second communication network, the method of the target reception node receives data from idle devices cooperating to manage interference. In one example, the data is generated using coefficients determined in the idle devices based on channel information of the idle devices.

At operation 930, the method of the target reception node decodes the data received.

FIG. 10 is a diagram illustrating a method to manage interference between idle devices in another example of a multi-hop network, in accordance with an embodiment.

Referring to FIG. 10, the multi-hop network includes a base station 1010, a first transmission node 1020, a second transmission node 1025, a first reception node 1030, a second reception node 1035, and idle devices 1040, 1045, and 1050. The base station 1010 may also be referred to as a coordinator because it is enabled to achieve interference-free communication through communication coordination with respect to the idle devices 1040, 1045, and 1050.

The base station 1010 may use global connectivity, for example a cellular network, as a control channel to coordinate communication with the transmission nodes 1020 and 1025, the reception nodes 1030 and 1035, and the idle devices 1040, 1045, and 1050. The transmission nodes 1020 and 1025, the reception nodes 1030 and 1035, and the idle devices 1040, 1045, and 1050 may use local connectivity, for example WiFi, Bluetooth, and Zigbee, as a data channel for data transmission.

In FIG. 10, the base station 1010 collects channel information received from the idle devices 1040, 1045, and 1050, and determines coefficients of the idle devices 1040, 1045, and 1050 using the collected channel information. In one example, the idle devices 1040, 1045, and 1050 transmit the channel information to the base station 1010 through a cellular network. According to the channel information, the base station 1010 determines the coefficients, thereby managing interference between a pair of a transmission node and a reception node.

Figure 11:
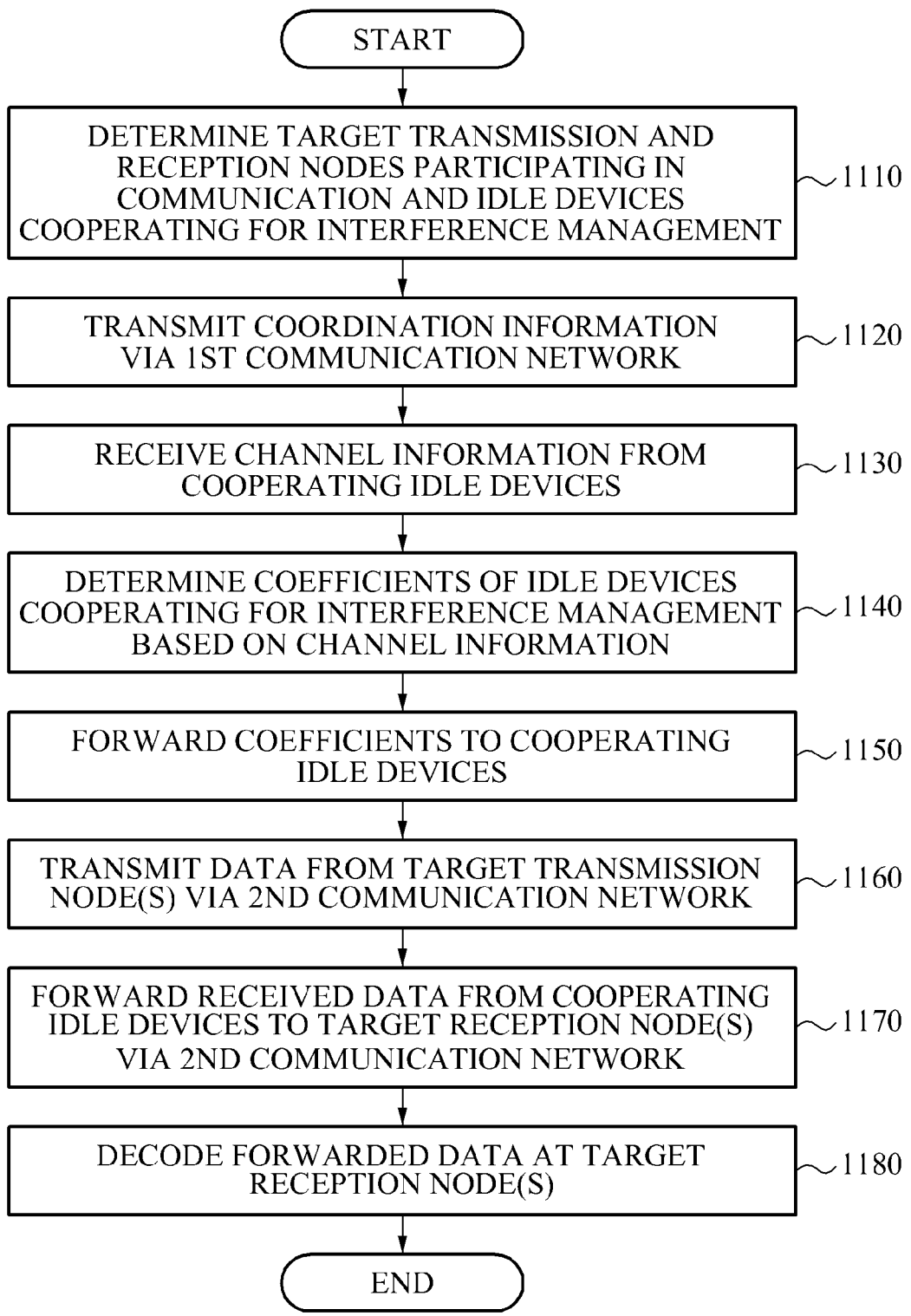
FIG. 11 is a diagram illustrating an overall operation performed in a coordinator, target transmission and reception nodes, and idle devices to manage interference in the multihop network of FIG. 10, in accordance with an embodiment.

FIG. 11 is a diagram illustrating an overall method performed in a coordinator, target transmission and reception nodes, and idle devices to manage interference in the multi-hop network of FIG. 10, in accordance with an embodiment.

Referring to FIG. 11, at operation 1110, the method determines at the coordinator target transmission nodes, target reception nodes, and idle devices cooperating to manage interference, which are to participate in communication, among nodes included in the multi-hop network.

At operation 1120, through a first communication network, the method at the coordinator transmits coordination information to the target transmission nodes and target reception nodes, and the idle devices cooperating to manage interference, which participate in the communication. The coordination information includes an indicator informing the target transmission node, the target reception node, and the cooperating idle devices of participation in the communication and an indicator informing the target transmission node, the target reception node, and the cooperating idle devices of execution of the communication using the second communication network.

At operation 1130, the method at the coordinator receives channel information from the cooperating idle devices with the coordination information.

At operation 1140, the method at the coordinator determines coefficients of the cooperating idle devices based on the channel information received, so that transmission of data between pairs of the target transmission nodes and the target reception nodes do not interfere with each other.

At operation 1150, the method at the coordinator transmits the coefficients determined to the idle devices.

At operation 1160, in response to the target transmitting nodes transmitting the coordination information transmit data to the idle devices through a second communication network, at operation 1170, the idle devices forward the data to the target reception nodes through the second communication network.

At operation 1180, the target reception nodes decode the data.

Figure 12:
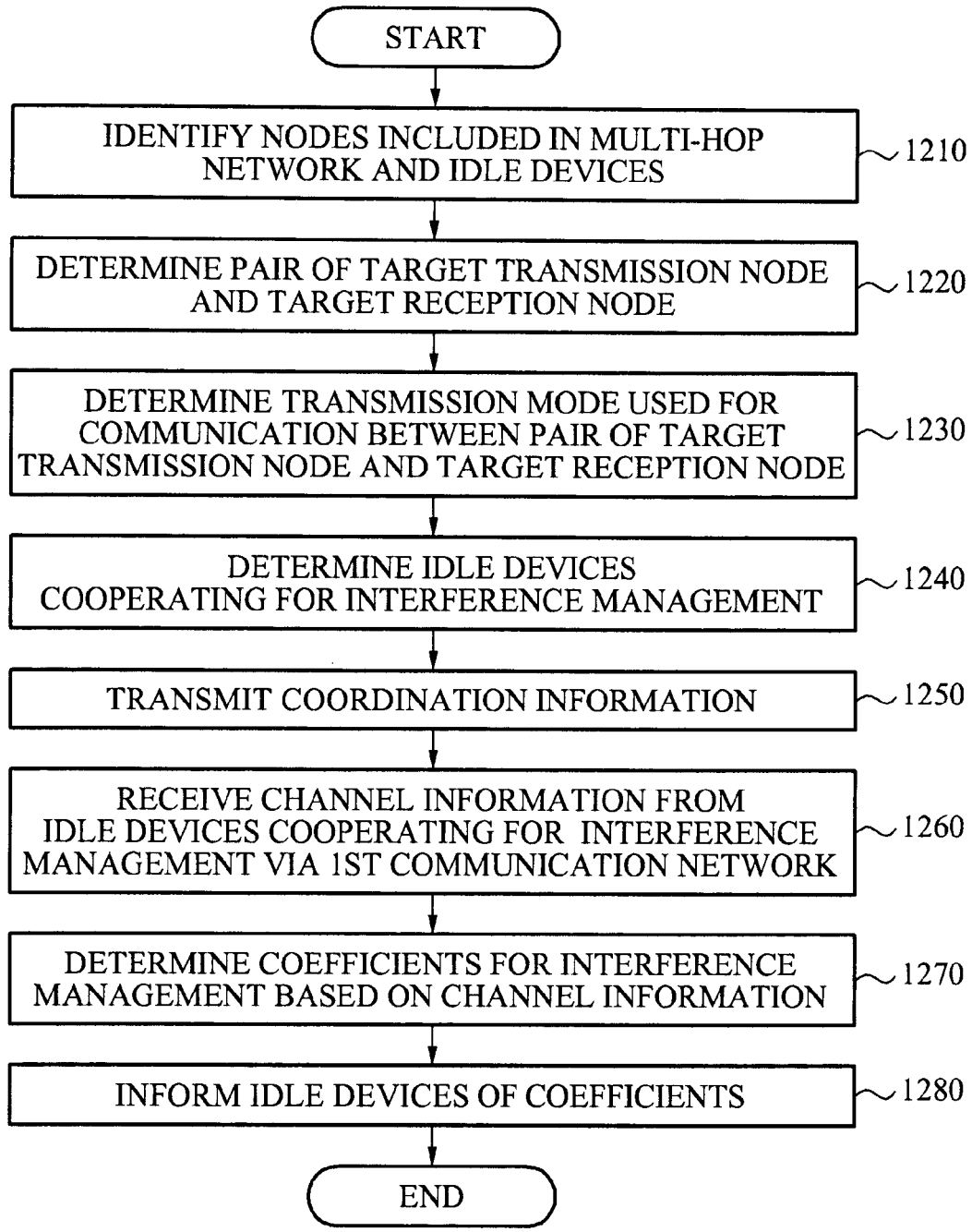
FIG. 12 is a flow chart illustrating a method to manage interference between idle devices through the coordinator of FIG. 10, in accordance with an embodiment.

FIG. 12 is a flow chart illustrating a method to manage interference between idle devices through the coordinator of FIG. 10, in accordance with an embodiment.

Referring to FIG. 12, at operation 1210, the method at the coordinator identifies nodes included in a multi-hop network and idle devices.

At operation 1220, the method determines a pair of a target transmission node and a target reception node among the nodes included in the multi-hop network.

At operation 1230, the method chooses or determines a transmission mode between a first transmission mode that uses a first communication network and a second transmission mode that uses a second communication network, to be used to communicate between the pair of the target transmission node and the target reception node. In one example, the method chooses the transmission mode based on a channel capacity of the first communication network and a channel capacity of the second communication network.

In one instance, the first communication network and the second communication network use different communication methods. In another example, when the first communication network and the second communication network use a same communication method, wireless resources orthogonal to each other may be used.

At operation 1240, the method at the coordinator determines idle devices cooperating to manage interference communication with the pair of the target transmission node and the target reception node included in the multi-hop network.

At operation 1250, the method transmits coordination information to communicate between the pair of the target transmission node and the target reception node to nodes participating in the communication and the cooperating idle devices. The coordination information may include an indicator informing the target transmission node, the target reception node, and the cooperating idle devices of participation in the communication and an indicator informing the target transmission node, the target reception node, and the cooperating idle devices of an execution in the communication using the second communication network.

At operation 1260, the method receives channel information from the cooperating idle devices through the first communication network.

In operation 1270, the method determines coefficients to manage interference based on the channel information received at operation 1260.

At operation 1280, the method informs the idle devices of the coefficients determined at operation 1270.

Figure 13:
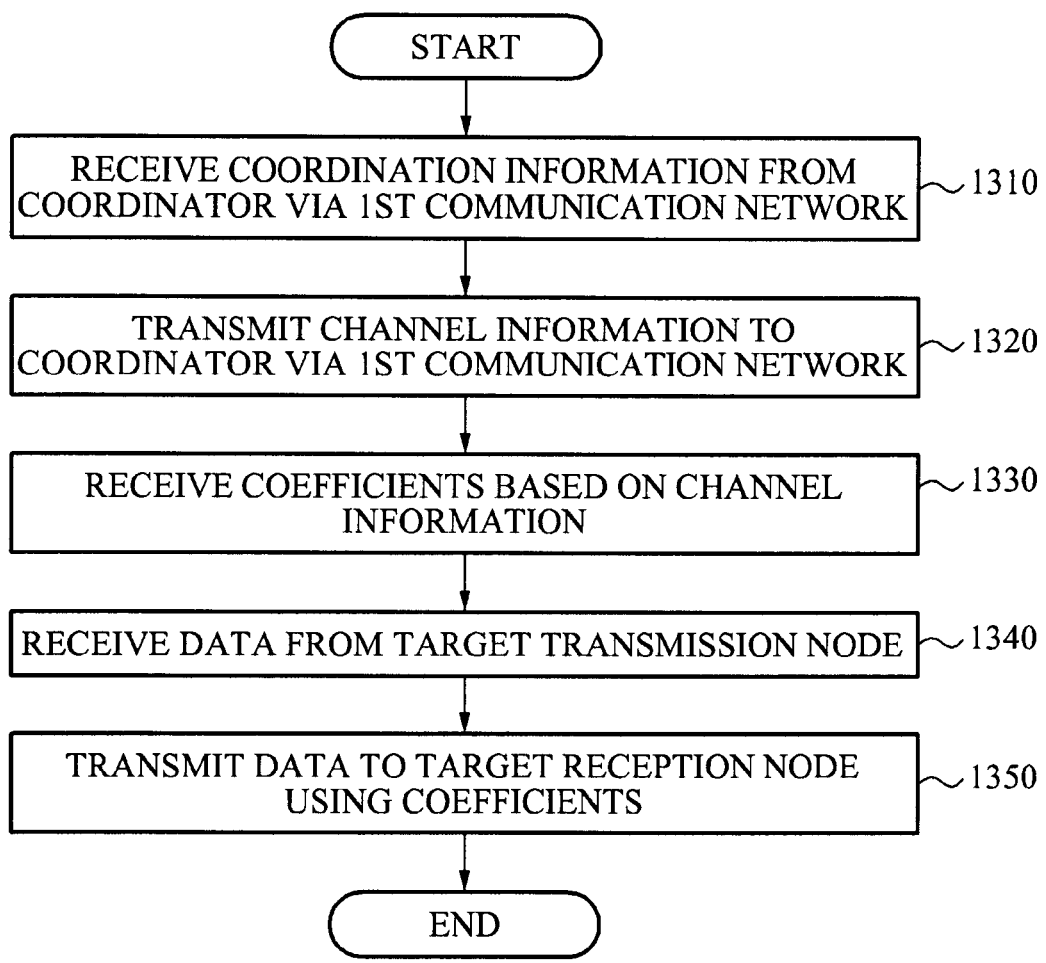
FIG. 13 is a flow chart illustrating a method to manage interference between idle devices through the idle device of FIG. 10, in accordance with an embodiment.

FIG. 13 is a flow chart illustrating a method to manage interference between idle devices through the idle device of FIG. 10, in accordance with an embodiment.

Referring to FIG. 13, at operation 1310, the method performed at the idle device receives from the coordinator, through a first communication network, coordination information for communication between a pair of a target transmission node and a target reception node.

At operation 1320, the method at the idle device transmits channel information to the coordinator, through the first communication network, according to the coordination information received at operation 1310.

At operation 1330, the method receives from the coordinator coefficients determined based on the channel information transmitted at operation 1320. In one illustrative example, the coefficients are used to manage interference during communication between the pair of the target transmission node and the target reception node.

At operation 1340, the method at the idle device receives data from the target transmission node and, at operation 1350, the method transmits the data to the target reception node using the coefficients determined in operation 1330.

Because the method to manage interference between idle devices by a target transmission node and a target reception node is same as the methods of FIGS. 8 and 9, the description corresponding to FIGS. 8 and 9 will be referenced.

Figure 14:
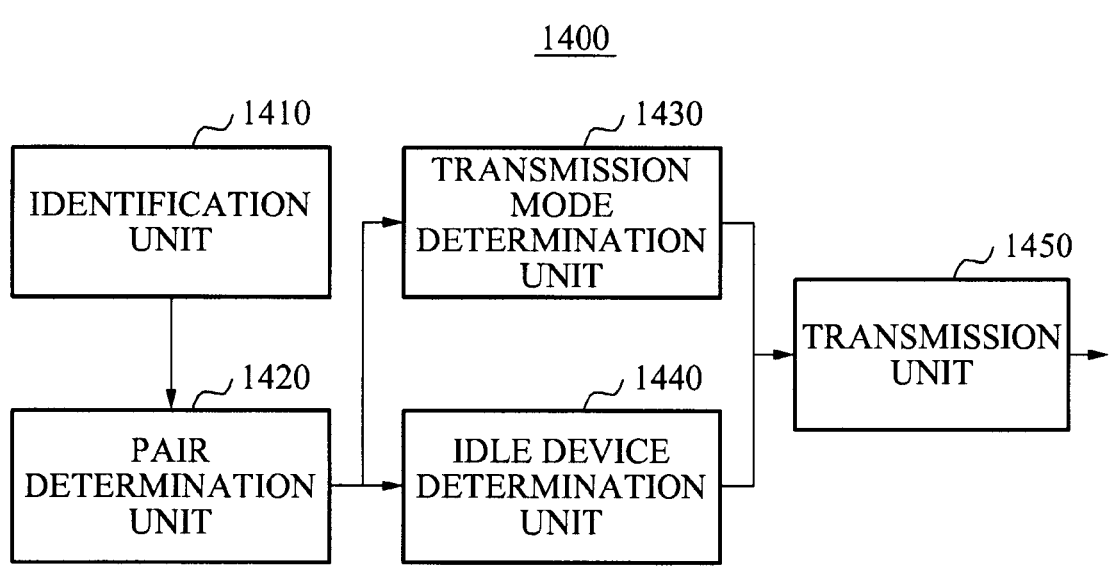
FIG. 14 is a block diagram illustrating an example of a coordinator that manages interference between idle devices, in accordance with an embodiment.

FIG. 14 is a block diagram illustrating an example of a coordinator that manages interference between idle devices, in accordance with an embodiment.

Referring to FIG. 14, the coordinator 1400 may include an identification unit or an identifier 1410, a pair determiner or determination unit 1420, a transmission mode determiner or determination unit 1430, an idle device determiner or determination unit 1440, and a transmitter or transmission unit 1450.

The identification unit 1410 identifies nodes included in a multi-hop network and idle devices.

The pair determination unit 1420 determines a pair of a target transmission node and a target reception node among the nodes included in the multi-hop network and that were identified at the identification unit 1410.

The transmission mode determination unit 1430 chooses or determines a transmission mode to communicate between the pair of the target transmission node and the target reception node, determined at the pair determination unit 1420. The transmission mode may include a first transmission mode that uses a first communication network and a second transmission mode that uses a second communication network.

Based on the transmission mode chosen at the transmission mode determination unit 1430, the idle device determination unit 1440 determines idle devices cooperating to manage interference communicating with the pair of the target transmission node and the target reception node.

The transmission unit 1450 transmits coordination information for the communication between the pair, to nodes participating in the communication. The nodes participating in the communication may be the pair of the target transmission node and the target reception node determined at the pair determination unit 1430. The transmission unit 1450 also transmits the coordination information to the cooperating idle devices determined at the idle device determination unit 1440.

Figure 15:
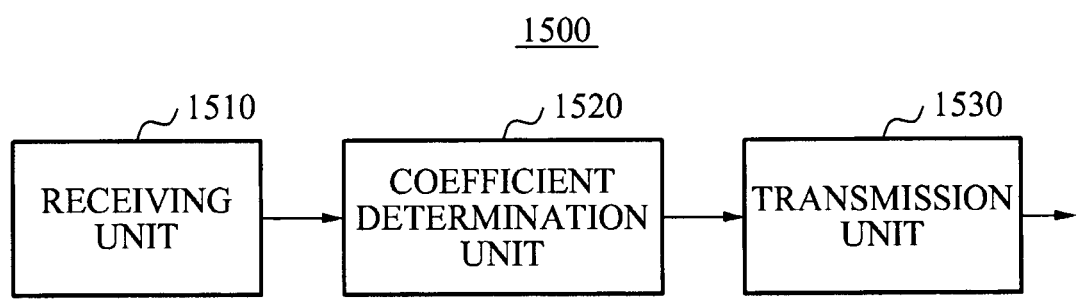
FIG. 15 is a block diagram illustrating an example of an idle device that manages interference between idle devices, in accordance with an embodiment.

FIG. 15 is a block diagram illustrating an example of an idle device 1500 that manages interference between idle devices, in accordance with an embodiment.

Referring to FIG. 15, the idle device 1500 may include a receiver 1510, a coefficient determiner or determination unit 1520, and a transmitter or transmission unit 1530. The idle device 1500 determines coefficients of the idle devices cooperating through exchange of channel information.

The receiver 1510 receives from a coordinator, through a first communication network, coordination information for communication between a pair of a target transmission node and a target reception node. Also, the receiver 1510 exchanges the channel information with the idle devices cooperating to manage interference in the communication between the pair, through the second communication network, according to the coordination information.

The coefficient determination unit 1520 determines the coefficients of the cooperating idle devices, based on the channel information received at the receiver 1510.

The transmission unit 1530 transmits the data received from the target transmission node to the target reception node, using the coefficients.

Figure 16:
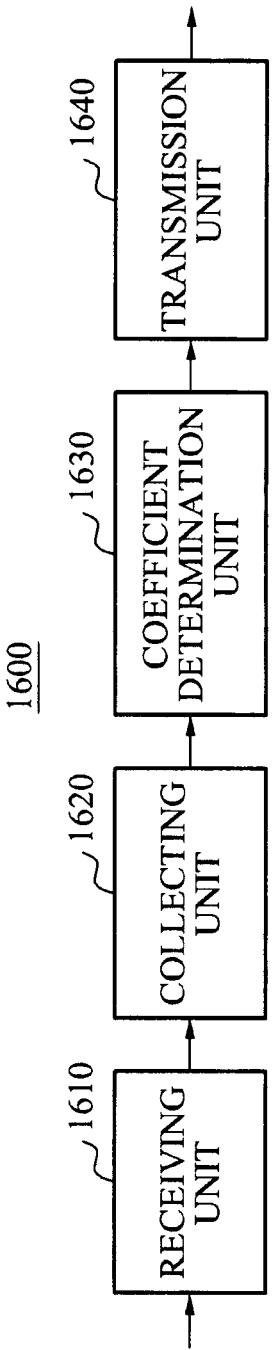
FIG. 16 is a block diagram illustrating another example of an idle device that manages interference between idle devices, in accordance with an embodiment.

FIG. 16 is a block diagram illustrating another example of an idle device 1600 that manages interference between idle devices, in accordance with an embodiment.

Referring to FIG. 16, the idle devices 1600 may include a receiver or a receiving unit 1610, a collector or collecting unit 1620, a coefficient determiner or determination unit 1630, and a transmitter or transmission unit 1640, and may determine coefficients of the idle devices cooperating using channel information collected from other information.

The receiving unit 1610 receives from a coordinator, through a first communication network, coordination information for communication between a pair of a target transmission node and a target reception node.

According to the coordination information, the collecting unit 1620 collects channel information through a second communication network from the idle devices cooperating to manage interference in communication.

The coefficient determination unit 1630 determines the coefficients of the cooperating idle devices based on the channel information collected at the collecting unit 1620.

The transmission unit 1640 informs other idle devices of the coefficients determined at the coefficient determination unit 1630. In addition, the transmission unit 1640 transmits the data received at the receiving unit 1610 from the target transmission node to the target reception node using the coefficient determined in the coefficient determination unit 1630.

Figure 17:
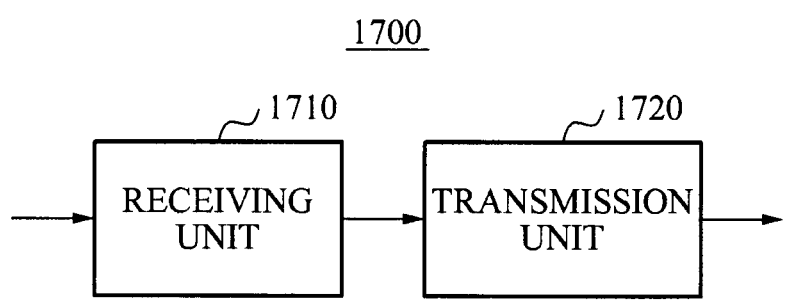
FIG. 17 is a block diagram illustrating an example of a target transmission node that manages interference between idle devices, in accordance with an embodiment.

FIG. 17 is a block diagram illustrating an example of a target transmission node 1700 that manages interference between idle devices, in accordance with an embodiment.

Referring to FIG. 17, the transmission node 1700 includes a receiver or a receiving unit 1710 and a transmitter or a transmission unit 1720.

The receiving unit 1710 receives from a coordinator, through a first communication network, coordination information for communication between a pair of a target transmission node and a target reception node.

The transmission unit 1720 may transmit data for the target reception node to the idle devices cooperating to manage interference communicating with the pair through a second communication network according to the coordination information received by the receiving unit 1710.

Figure 18:
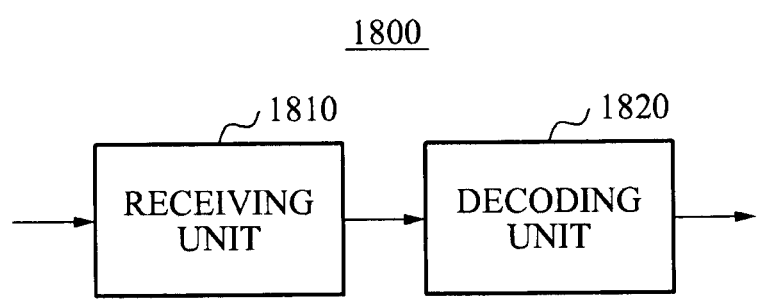
FIG. 18 is a block diagram illustrating an example of a target reception node that manages interference between idle devices, in accordance with an embodiment.

FIG. 18 is a block diagram illustrating an example of a target reception node 1800 that manages interference between idle devices, in accordance with an embodiment.

Referring to FIG. 18, the target reception node 1800 includes a receiver or a receiving unit 1810 and a decoder or a decoding unit 1820.

The receiving unit 1810 receives from a coordinator, through a first communication network, coordination information for communication between a pair of a target transmission node and a target reception node. In addition, the receiving unit 1801 may receive data from the idle devices cooperating to manage interference communicating with the pair, through a second communication network according to the coordination information. The data may be generated using coefficients determined in the cooperating idle devices, based on channel information of the idle devices.

The decoding unit 1820 decodes the data received at the receiving unit 1810.

Figure 19:
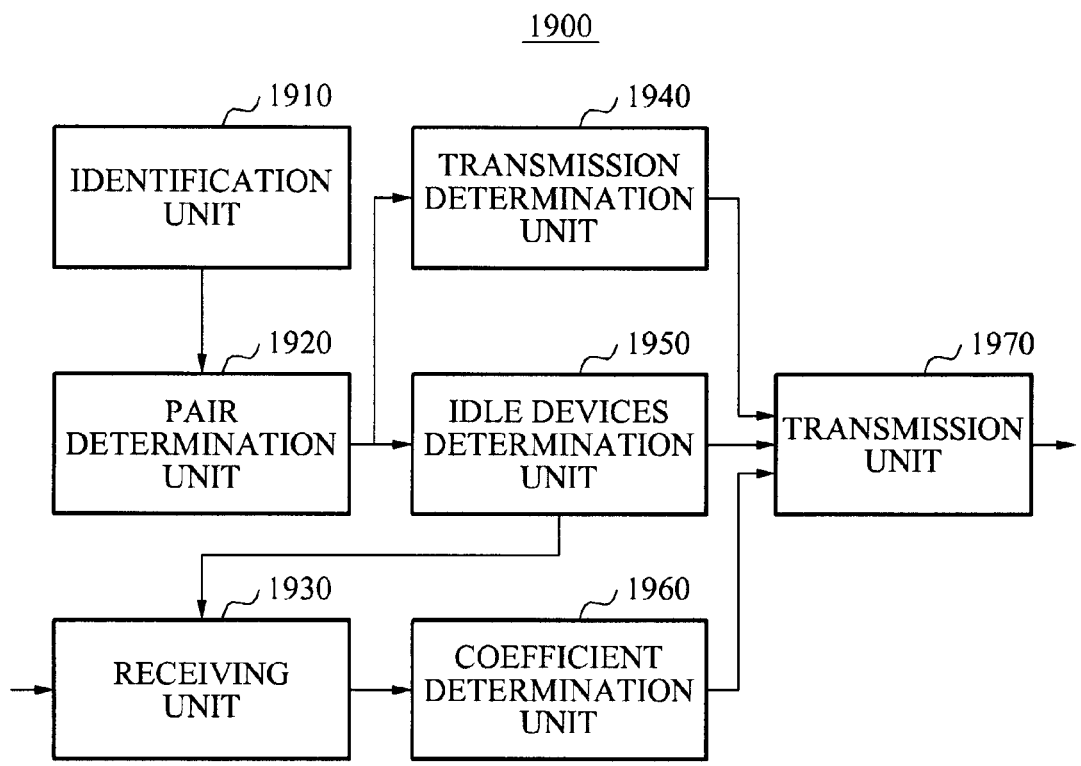
FIG. 19 is a block diagram illustrating another example of a coordinator that manages interference between idle devices, in accordance with an embodiment.

FIG. 19 is a block diagram illustrating another example of a coordinator 1900 that manages interference between idle devices, in accordance with an embodiment.

Referring to FIG. 19, the coordinator 1900 may include an identifier or identification unit 1910, a pair determination unit 1920, a receiver receiving unit 1930, a transmission determiner or determination unit 1940, an idle devices determiner or determination unit 1950, a coefficient determiner or determination unit 1960, and a transmitter or a transmission unit 1970.

The identification unit 1910 identifies nodes included in a multi-hop network and idle devices.

The pair determination unit 1920 determines a pair of a target transmission node and a target reception node among the nodes included in the multi-hop network, identified by the identification unit 1910.

The receiving unit 1930 receives, through a first communication network, channel information from the idle devices cooperating to manage interference.

The transmission mode determination unit 1940 chooses or determines a transmission mode used for communication between the pair of the target transmission node and the target reception node. The transmission mode may include a first transmission mode that uses a first communication network and a second transmission mode that uses a second communication network.

In one configuration, the first communication network and the second communication network use different communication methods. In another configuration, when the first communication network and the second communication network use a same communication method, wireless resources may be used, orthogonal to each other.

The transmission mode determination unit 1940 chooses or determines a transmission mode based on a channel capacity of the first communication network and a channel capacity of the second communication network.

The idle device determination unit 1950 determines idle devices cooperating to manage interference communicating with the pair of the target transmission node and the target reception node included in the multi-hop network. The idle device determination unit 1950 determines the idle devices according to the transmission mode chosen or determined by the transmission mode determination unit 1940.

The coefficient determination unit 1960 may determine coefficients to manage interference communicating with the pair based on the channel information received by the receiving unit 1930.

The transmission unit 1970 transmits coordination information for communication between the pair to nodes participating in communication and the idle devices.

The coordination information may include at least one of an indicator informing the target transmission node, the target reception node, and the cooperating idle devices of participation in the communication. The coordination information may also include an indicator informing the target transmission node, the target reception node, and the cooperating idle devices of the communication using the second communication network. In one example, the idle devices determined by the idle device determination unit 1950 may be idle devices cooperating to manage interference communicating with the pair of the target transmission node and the target reception node.

The target transmission node and the target reception node included in the multi-hop network, and the cooperating idle devices may communicate with one another through the second communication network.

The transmission unit 1970 informs the idle devices of the coefficients determined by the coefficient determination unit 1960.

Figure 20:
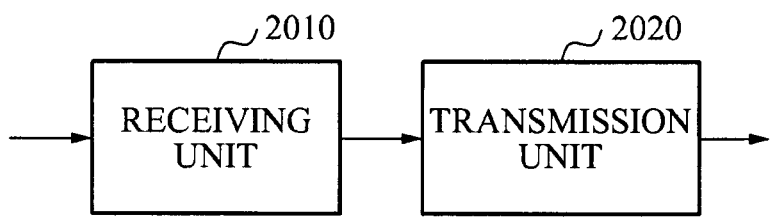
FIG. 20 is a block diagram illustrating still another example of an idle device that manages interference between idle devices, in accordance with an embodiment.

FIG. 20 is a block diagram illustrating still another example of an idle device 2000 that manages interference between idle devices, in accordance with an embodiment.

Referring to FIG. 20, the idle devices 2000 include a receiver or a receiving unit 2010 and a transmitter or a transmission unit 2020.

The receiving unit 2010 receives coordination information for communication between a pair of a target transmission node and a target reception node, from a coordinator through a first communication network.

The transmission unit 2020 transmits channel information to the coefficient through the first communication network according to the coordination information received at the receiving unit 2010.

The receiving unit 2010 may receive coefficients determined based on the channel information, so as to manage interference communicating with the pair from the coordinator.

The transmission unit 2020 may transmit the data received from the target transmission node to the target reception node using the coefficients received by the receiving unit 2010.

In accord with one illustrative example, at least one of the many advantages associated with at least some of the embodiments described above increase a network capacity by transmitting a plurality of data streams through cooperation of various idle devices present around transmission nodes and reception nodes.

In accord with another illustrative example, at least one of the many advantages associated with at least some of the embodiments described above, it is possible to offload traffic of a global network because data may be transmitted by a plurality of users, such as, transmission nodes and reception nodes, through cooperation of idle devices in a local network without resources of the global network.

The units and apparatuses, including, but not limited to, a transmission node, a reception node, an idle device, and a coordinator, described herein may be implemented using hardware components. The hardware components may include, for example, controllers, sensors, processors, generators, drivers, and other equivalent electronic components. The hardware components may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The hardware components may run an operating system (OS) and one or more software applications that run on the OS. The hardware components also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a hardware component may include multiple processors or a processor and a controller. In addition, different processing configurations are possible, such a parallel processors.

It is to be understood that in the embodiment of the present invention, the operations in FIGS. 3, 4, 6-9, and 11-13 are performed in the sequence and manner as shown although the order of some steps and the like may be changed without departing from the spirit and scope of the present invention. In accordance with an illustrative example, a computer program embodied on a non-transitory computer-readable medium may also be provided, encoding instructions to perform at least the method described in FIGS. 3, 4, 6-9, and 11-13.

Program instructions to perform a method described in FIGS. 3, 4, 6-9, and 11-13, or one or more operations thereof, may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable recording mediums. Also, functional programs, codes, and code segments for accomplishing the example embodiments disclosed herein may be easily construed by programmers skilled in the art to which the embodiments pertain based on and using the flow diagrams and block diagrams of the figures and their corresponding descriptions as provided herein.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents.

Accordingly, other implementations are within the scope of the following claims.

What is claimed is:

1. A method to manage interference, comprising:
   determining a transmission mode between a first transmission mode of a first communication network and a second transmission mode of a second communication network for communication between a target transmission node and a target reception node;
   determining idle devices that are cooperating, to manage the interference based on the transmission mode;
   transmitting coordination information to nodes that are participating in the communication and the idle devices for the communication between the target transmission node and the target reception node,
   receiving channel information from the idle devices through a first communication network;
   determining amplifying coefficients to manage the interference based on the channel information; and
   transmitting the amplifying coefficients to the idle devices.

2. The method of claim 1, wherein the determining of the transmission mode comprises:
   determining the transmission mode based on a channel capacity of the first communication network and a channel capacity of the second communication network.

3. The method of claim 1, wherein the determining of the idle devices comprises:
   determining the idle devices cooperating to manage interference in the communication among idle devices connected through the second communication network in response to the transmission mode being the second transmission mode that uses the second communication network.

4. The method of claim 1, further comprising:
   identifying the nodes in the multi-hop network and the idle devices.

5. The method of claim 1, wherein the coordination information comprises at least one of an indicator informing the target transmission node, the target reception node, and the idle devices of participation in the communication and an indicator informing the target transmission node, the target reception node, and the cooperating idle devices of the communication using the second communication network.

6. The method of claim 1, wherein the first communication network uses a different communication method from a communication method of the second communication network.

7. The method of claim 1, wherein the first communication network and the second communication network use wireless resources orthogonal to each other when the first communication network and the second communication network use a same communication method.

8. The method of claim 1, wherein the target transmission node and the target reception node in the multi-hop network, and the cooperating idle devices communicate with one another using the second communication network.

9. A non-transitory computer readable recording medium storing a program to cause a computer to execute the method of claim 1.

10. An apparatus of an idle device to manage interference, comprising:
a determining unit configured to determine idle devices cooperating, to manage the interference based on a transmission mode;
a receiver configured to receive coordination information to communicate between a target transmission node and a target reception node through a first communication network, and configured to exchange, in a second communication network, channel information with other idle devices cooperating to manage interference during communication between the target transmission node and the target reception node based on the coordination information;
an amplifying coefficient determination unit configured to determine amplifying coefficients of the other idle devices based on the channel information; and
a transmitter configured to transmit the data to the target reception node using the amplifying coefficients,
wherein the other idle devices are determined based on a transmission mode.

11. A method to manage interference, comprising:
determining idle devices that are cooperating, based on a transmission mode, to manage the interference between a target transmission node and a target reception node in a multi-hop network;
receiving channel information from the idle devices through a first communication network;
determining amplifying coefficients to manage interference based on the channel information; and
transmitting the amplifying coefficient to the idle devices.

12. The method of claim 11, further comprising:
determining the target transmission node and the target reception node among nodes in a multi-hop network; and
transmitting coordination information to nodes and the idle devices for communication between the target transmission node and the target reception node.

13. The method of claim 11, further comprising:
determining a transmission mode between a first transmission mode that uses the first communication network and a second transmission mode that uses a second communication network used for communication between the target transmission node and the target reception node.

14. The method of claim 13, wherein the determining of the transmission mode comprises:
determining the transmission mode based on a channel capacity of the first communication network and a channel capacity of the second communication network.

15. The method of claim 11, further comprising:
identifying nodes in the multi-hop network and the idle devices.

16. The method of claim 11, wherein the coordination information comprises at least one of an indicator informing the target transmission node, the target reception node, and the idle devices of participation in communication and an indicator informing the target transmission node, the target reception node, and the idle devices of execution of the communication using the second communication network.

17. The method of claim 11, wherein the target transmission node and the target reception node and the idle devices communicate with one another using the second communication network.

18. The method of claim 11, wherein the first communication network uses a different communication method from a communication method of the second communication network.

19. The method of claim 11, wherein the first communication network and the second communication network use wireless resources orthogonal to each other when the first communication network and the second communication network use a same communication method.

20. An apparatus to manage interference, comprising:
a determining unit configured to determine idle devices that are cooperating, to manage the interference based on a transmission mode;
a collecting unit configured to collect channel information according to coordination information from the idle devices cooperating to manage the interference through a second communication network;
an amplifying coefficient determination unit configured to determine amplifying coefficients of the idle devices cooperating to manage the interference between a target transmission node and a target reception node based on the channel information; and
a transceiver configured to inform the idle devices of the amplifying coefficients to use when transmitting data, wherein the idle devices cooperating to manage the interference are determined based on a transmission mode.

21. A method of an idle device to manage interference, comprising:
determining idle devices that are cooperating, to manage the interference based on a transmission mode;
receiving coordination information to communicate between a target transmission node and a target reception node through a first communication network;
exchanging, in a second communication network, channel information with other idle devices cooperating to manage interference during communication between the target transmission node and the target reception node based on the coordination information;
determining amplifying coefficients of the other idle devices based on the channel information; and
transmitting the data to the target reception node using the amplifying coefficients,
wherein the other idle devices are determined based on a transmission.

22. The method of claim 21, further comprising:
multiplying the data by the amplifying coefficients and output a product indicative thereof to the target reception node.

23. An apparatus to manage interference, comprising:
a transmission mode determination unit configured to determine a transmission mode between a first transmission mode of a first communication network and a second transmission mode of a second communication network for communication between a target transmission node and a target reception node;
an idle device determination unit configured to determine idle devices that are cooperating, to manage the interference based on the transmission mode; and
a transceiver configured to transmit coordination information to nodes that are participating in the communication and the idle devices for the communication between the target transmission node and the target reception node,
wherein the transceiver is further configured to receive channel information from the idle devices through a first communication network; and
an amplifying coefficient determination unit to determine amplifying coefficients to manage interference based on the channel information,
wherein the transceiver is further configured to transmit the amplifying coefficients to the idle devices.

24. The apparatus of claim 23, wherein the idle device determination unit is further configured to determine the idle devices cooperating to manage interference in the communication among idle devices connected through the second communication network in response to the transmission mode being the second transmission mode that uses the second communication network.

25. The apparatus of claim 23, wherein the first communication network and the second communication network use wireless resources orthogonal to each other when the first communication network and the second communication network use a same communication apparatus.

26. The apparatus of claim 23, wherein the target transmission node and the target reception node in the multi-hop network, and the cooperating idle devices communicate with one another using the second communication network.

27. An apparatus to manage interference, comprising:
an idle devices determination unit configured to determine idle devices that are cooperating, to manage the interference based on a transmission mode, between a target transmission node and a target reception node in a multi-hop network;
a receiver configured to receive channel information from the idle devices through a first communication network;
an amplifying coefficient determination unit configured to determine amplifying coefficients to manage interference based on the channel information; and
a transmitter configured to transmit the amplifying coefficients to the idle devices.

28. The apparatus of claim 27, wherein the first communication network and the second communication network use wireless resources orthogonal to each other when the first communication network and the second communication network use a same communication apparatus.

29. The apparatus of claim 27, further comprising:
a transmission determination unit configured to determine the target transmission node and the target reception node among nodes in a multi-hop network, wherein the transmitter is further configured to transmit coordination information to nodes and the idle devices for communication between the target transmission node and the target reception node.

30. The apparatus of claim 27, further comprising:
a transmission determination unit configured to determine a transmission mode between a first transmission mode that uses the first communication network and a second transmission mode that uses a second communication network used for communication between the target transmission node and the target reception node.

31. The apparatus of claim 30, wherein the transmission determination unit is further configured to determine the transmission mode based on a channel capacity of the first communication network and a channel capacity of the second communication network.

32. A method to manage interference, comprising:
determining idle devices that are cooperating, to manage the interference based on a transmission mode;
collecting channel information according to coordination information from the idle devices that are cooperating, to manage the interference through a second communication network;
determining amplifying coefficients of the idle devices cooperating to manage the interference between a target transmission node and a target reception node based on the channel information; and
transmitting the amplifying coefficient to the idle devices, wherein the idle devices cooperating to manage the interference are determined based on a transmission mode.

33. The method of claim 32, further comprising:
transmitting data received from the target transmission node to the target reception node using the amplifying coefficients.

* * * * *